(No Model.)

G. S. SINGER.
DRINKING TROUGH.

No. 484,057. Patented Oct. 11, 1892.

WITNESSES
Thos. Houghton.
Frank B. Marlow,

INVENTOR
George S. Singer,
By Chas. F. Benjamin
His Atty.

UNITED STATES PATENT OFFICE.

GEORGE S. SINGER, OF CARDINGTON, OHIO.

DRINKING-TROUGH.

SPECIFICATION forming part of Letters Patent No. 484,057, dated October 11, 1892.

Application filed February 6, 1892. Serial No. 420,501. (No model.)

*To all whom it may concern:*

Be it known that I, GEORGE S. SINGER, a citizen of the United States, residing at Cardington, in the county of Morrow and State of Ohio, have invented certain new and useful Improvements in Drinking-Troughs for Animals; and I do hereby declare the following to be a full, clear, and exact description of the invention, such as will enable others skilled in the art to which it appertains to make and use the same.

This invention relates to portable apparatus for supplying drinking-water to animals; and its object is to prevent freezing of the water when exposed to low temperatures.

The invention consists in such a combination of the apparatus as will enable a supply of water to be stored in a tank, from which it escapes into a connected drinking-trough as fast as necessary to maintain a calculated level of water in the trough, the water being kept in a liquid state by heating the tank and trough from a heat-generator below the tank and trough.

Figure 1:
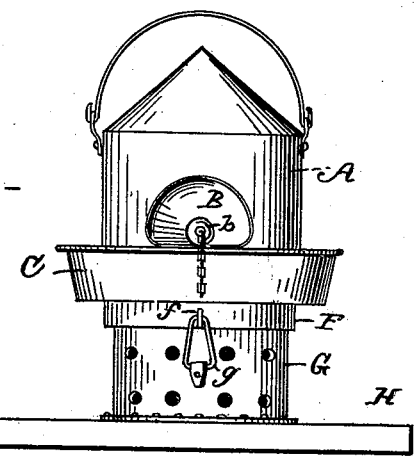
Figure 2:
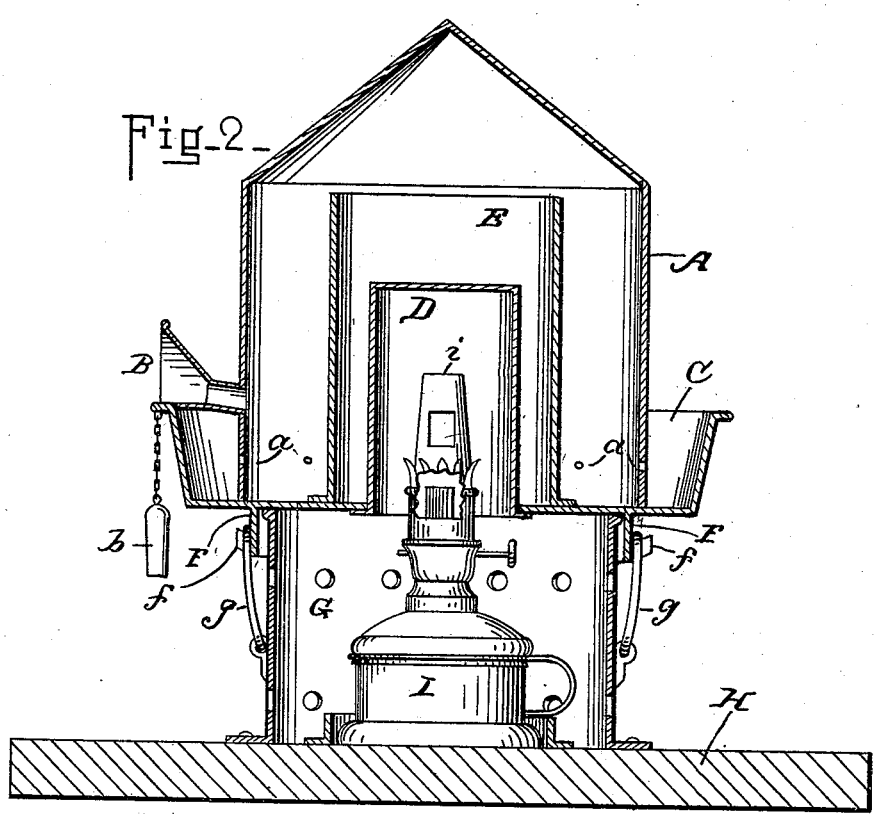

In the accompanying drawings, wherein like letters represent like parts, Figure 1 is a front elevation of my improved drinking-fountain, and Fig. 2 a central vertical section of the same.

A is a sheet-metal tank, to be fed with water through the funnel B, provided with a stopper $b$, the tank being tilted till filled with water and the funnel tightly stoppered. The lower part of the tank is formed into a trough C, whence the animals obtain their supply. The interior construction of the tank is substantially as shown in the drawings, wherein D is a heating-drum, open only at the lower end and flush with the tank-bottom, and rising, preferably, about two-thirds the height of the tank. It is not in any event to rise above the closed top of the tank. Around the drum, inside the tank, is a water-tight jacket E, rising above the closed head of the drum, which must be kept low enough to permit the jacket to overtop it without emerging from the tank, with space between to contain a supply of water to prevent injury by heat to the drum if the drinking-supply within the tank should become exhausted. The water escapes into the trough through orifices $a$ $a$ in the wall or walls of the tank, formed in one and the same horizontal plane, around or about the wall or walls and placed at such a distance between the bottom and edge of the trough as will enable a sufficient supply of water to flow into the trough before the orifices are sealed by the trough-water and the flow suspended. A rim F is formed on the bottom of the tank, which fits over a ventilated jacket G and keeps the tank in true position upon the top edge of that jacket. The jacket G, which is smaller in circumference than the tank, is suitably mounted upon a base H, and upon the base and within the jacket is a lamp I, having a conical chimney $i$ to direct the current of heat generated by the lamp into the heating-drum of the tank. The jacket G must be high enough to permit the escape through its orifices of the smoke and gas generated by the lamp.

For the purpose of conveniently carrying the apparatus about I have shown eye-catches $g$ $g$ upon the exterior of the jacket G, which engage with hooks or lugs $f$ $f$ upon the rim F of the tank.

I have illustrated and described my apparatus as constructed especially for the use of fowls, but it is obvious that substantially the same construction will answer for other kinds of domestic animals.

Instead of using a funnel, as shown, to feed the tank, I may use a stop-cock or water-valve with hose and force-pump, or may resort to any other suitable means of supplying water to the tank. In large tanks I should prefer to feed the tank with water through the top.

I do not confine myself to the lamp-pattern of heat-generator shown and described, herein for I may introduce a jet or jets of illuminating-gas or a jet or jets of flame produced in any familiar manner to the jacket G for the purpose of heating the water-tank, it being only necessary to suitably provide the said jacket with a continuous supply of heat, directed upon the bottom and into the drum of the tank, so as to minimize the loss by radiation or escape from the jacket. It is, however, essential to the proper working of my invention that the heat-generating apparatus should be substantially inferior to the watering apparatus in size and dimensions, so that decidedly the larger part of the material and space devoted to the construction as a whole should be applied to the principal object of watering the animals, and that they may have safe and ready access to the drinking-trough when it is mounted on the heating apparatus. It is also essential that the heating-drum should be tightly closed at the top and not used as a smoke-vent, and for this reason I have been careful to adapt it to co-operation with the familiar device of a water-jacket to preserve it from injury if the drinking-water in the fountain should happen to become exhausted.

I am aware that drinking-fountains for animals of the general character herein shown and described are common, and hence I claim nothing, broadly, in my construction of such a fountain.

I claim as follows:

The combination of the top-closed water-tank provided with means for the introduction of feed-water and having, also, the vertical open-bottomed top-closed heating-drum wholly within said tank, the open-topped water-jacket wholly within the tank, inclosing the aforesaid drum, and the water-space between drum and jacket and rising above the top of the drum, the trough formed around the outside and at the bottom of the water-tank, and the apertures formed in a single horizontal plane around the wall of the tank at a proper distance above the floor and below the rim of the said trough, with the vertical open-topped perforated heating-jacket fitting against the bottom of the aforesaid water-tank and provided interiorly with means for sending a current of heat upward and into the aforesaid heating-drum, the whole constructed and arranged as and for the purposes hereinbefore fully described.

In testimony whereof I affix my signature in presence of two witnesses.

GEORGE S. SINGER.

Witnesses:
  GEO. C. MILLER.
  WILL CURL, Jr.